United States Patent Office 3,646,178
Patented Feb. 29, 1972

3,646,178
METHOD OF PREPARING MICROPOROUS SHEET STRUCTURES
Harro Traübel, Leverkusen, Bruno Zorn, Cologne-Flittard, and Klaus König and Wolfgang Heydkamp, Leverkusen, Germany, assignors to Farbenfabriken Bayer Aktiengesellschaft, Leverkusen, Germany
No Drawing. Filed Mar. 26, 1969, Ser. No. 810,839
Claims priority, application Germany, Apr. 2, 1968,
P 17 69 089.0
Int. Cl. B29d 27/04; C08g 41/04
U.S. Cl. 264—41    4 Claims

ABSTRACT OF THE DISCLOSURE

Shaped products are obtained by coagulating aqueous dispersions (latices) of polymers of olefinically unsaturated compounds, for example an emulsion of polyvinyl chloride, by preparing a polyurethane-polyurea in these dispersions.

---

The production of shaped products, especially of sheet structures such as coatings and foils, from aqueous polymer dispersions is known. Such shaped products can also be obtained from polyurethane dispersions containing emulsifiers. Notwithstanding, the preparation and use of a mixture of these two types of dispersions is very difficult because of their incompatibility and products obtained from such mixtures have unsatisfactory properties.

It is therefore an object of this invention to provide shaped products and a method for the production thereof which is devoid of the foregoing disadvantages.

Another object of this invention is to provide microporous sheets from aqueous dispersions of polymers which microporous sheets have good physical and mechanical properties.

A further object of this invention is to provide a method for the preparation of shaped products wherein a mixture of two types of dispersions which were formerly incompatible is employed.

The foregoing objects and others are accomplished in accordance with this invention, generally speaking, by providing shaped products and a method for the production thereof from aqueous dispersions of polymers of olefinically unsaturated compounds which dispersions are coagulated by producing a polyurethane-polyurea reaction product therein.

The term shaped or molded product as used herein is intended to cover any shaped article including materials which contain the coagulated dispersions in a finely divided form such as, for example, fiber fleeces. Sheet structures such as coatings and foils which in turn can be applied to substrates by bonding with adhesives, for example, are preferred.

The aqueous dispersions of polymers of unsaturated compounds employed in this invention include latices of thermoplastic or elastomeric polymers obtained from polymerizable mono- or diolefinically unsaturated compounds or copolymers thereof. Any such ordinary commercial dispersions of this type may be used such as, for example, rubber latices of many different types including natural rubber latices, polybutadiene latices, styrene-butadiene rubber latices, polyisoprene latices, nitrile rubber latices (butadiene-acrylonitrile and butadiene-acrylonitrile-methacrylic acid copolymers), latices of thermoplastic resins such as polyvinyl chloride, styrene, acrylonitrile or polystyrene and so on. The latices usually contain from about 5% to about 70% solids and those commercial latices having a solids content of between about 30% and about 60% are generally preferred. Latices which are particularly suitable, together with their properties, are listed in the following Table C.

TABLE C.—COMMERCIAL POLYMER DISPERSIONS

| No. | Polymer | Percent in water | Physical properties of the polymer | |
|---|---|---|---|---|
| | | | Defo hardness | Particle size (m.) |
| C1 | (34%) copolymer of acrylonitrile butadiene and methacrylic acid | 50 | 1,000 | 60–80 |
| C2 | Butadiene-acrylonitrile and 4% methacrylic acid | 45 | 1,500 | 60–80 |
| C3 | Butadiene-acrylonitrile-styrene and 15% methacrylic acid | 35 | 8,000 | 60–80 |
| C4 | 2-chlorobutadiene polymerized with a compound containing carboxyl groups | 50 | Medium tendency to crystallize | |
| C5 | 2-chlorobutadiene | 50 | 2,500 | 160 |
| C6 | Butadiene-(28%)-acrylonitrile | 45 | 1,800 | 60–80 |
| C7 | Polyisobutylene | 60 | | 1,200–1,400 |
| C8 | Polyvinyl chloride | 60 | K-value: 70 | |
| C9 | Acrylate [1] | 40 | Shore hardness A: 28–35 | |
| C10 | Vinylidene chloride | 50 | | 200 |
| C11 | 33% acrylonitrile, 67% butadiene | 40 | Mooney viscosity ML-4' (100° C.): 70. | 5–10 |

[1] Copolymer of acrylic acid, butyl acrylate and styrene.

The monomers used in the preparation of such latices are known and described, for example, in Houben-Weyl "Makromolekulare Stoffe," part 1, Stuttgart 1961, pages 26 to 30 and pages 32 to 33 as well as in the literature cited therein.

Examples of suitable polymers, all of which are commercially available, are: Natural and synthetic rubbers such as polybutadienes, polyisoprene, polychloroprene, styrene-butadiene rubber, butadiene-acrylonitrile copolymers, and more or less thermoplastic materials such as polyvinyl chloride, polyvinylidene chloride, polystyrene, ethylene-vinylacetate copolymers, polyacrylonitrile, styrene-acrylonitrile copolymers and more specialized products such as copolymers of butadiene, acrylonitrile and methacrylic acid, or copolymers of butadiene, acrylonitrile, styrene and methacrylic acid.

The polyurethane polyureas produced in these latices may generally be obtained in the following ways:

(I) The reaction of an isocyanate prepolymer (i.e. a higher molecular weight compound containing at least two terminal isocyanate groups) with water or a polyamine.

(II) The reaction of an amino prepolymer (i.e. a higher molecular weight compound containing at least two terminal amino groups which may be primary or secondary) with a di- or polyisocyanate.

(III) The reaction of an isocyanate prepolymer with an amino prepolymer.

These reactions as well as the starting materials employed therein are known and have been described, for example, in Houben-Weyl "Makromolekulare Stoffe," part 2, Stuttgart 1963, page 83 and pages 169 and 171. Such reactions may be carried out as follows:

METHOD I

The isocyanate prepolymers referred to as A prepolymers in the examples are prepared in known manner by reacting an excess of a polyisocyanate with a higher molecular weight compound containing at least two active hydrogen atoms as determined by the Zerewitinoff method. Some suitable higher molecular weight active hydrogen containing compounds which may be thus employed include those listed in U.S. Pat. No. 3,201,372 and mixtures thereof in addition to any suitable polyesters or polyester amides prepared from hydroxycarboxylic acids, dicarboxylic acids, polyols, polyamines, hydrazines, amino alcohols or aminocarboxylic acids using known methods. Some suitable acids which may be used include hydroxycaproic acid, malonic acid, succinic acid, adipic acid, methyladipic acid, sebacic acid, thiodipropionic acid, maleic acid, phthalic acid and terephthalic acid. Some suitable polyols which may be used include ethylene glycol, di-, tri- and poly-ethylene glycols, polypropylene glycols, butane-1,3-diol and -1,4-diol, hexane-1,6-diol, acetals produced by the reaction of glycols with formaldehyde, glycerol, pentaerythritol, trimethylol propane and hexane-1,2,6-triol. Amines such as, for examples, ethylene diamine, tetramethylene - 1,4-diamine, hexamethylene-1,6-diamine, piperazine, 1,3- and 1,4-phenylene diamine, ethanolamine, propanolamine and N-methyldiethanolamine may also be used.

Any suitable polyethers including those obtained, for example, by the addition of alkylene oxides such as ethylene oxide or propylene oxide to water, hydrogen sulphide, ammonia or polyols such as ethylene glycol, propane-1,3- and -1,2-diol, trimethylol propane, glycerol and di(hydroxyalkyl)-alkylamines are also suitable. If desired in the preparation of such polyethers several different alkylene oxides may enter into the reaction simultaneously or successively. Polythioethers prepared, for example, by the condensation of thiodiglycol with itself or by reaction with alkylene oxides are also suitable. Polyacetals such as those formed, for example, from hexane-1,6-diol with formaldehyde may also be used as a starting material for the preparation of the A prepolymers, as may polysiloxanes prepared, for example, by reacting dialkylsilicon dihalides with water.

The molecular weight of the above mentioned higher molecular weight compounds containing active hydrogen atoms preferably lies between about 500 and about 10,000.

The prepolymer is obtained by reacting an excess of any suitable organic polyisocyanate with the active hydrogen containing compound. Some such suitable polyisocyanates include any of those listed herein as well as those suggested in U.S. Pat. No. 3,201,372, Canadian Pat. No. 698,636 and mixtures thereof.

The NCO prepolymers thus obtained (prepolymers A) are either reacted with water which, in any case, is present in the polymer latices, or with any suitable compounds containing at least two basic amino groups. Some such suitable amino compounds include low molecular weight polyamines such as, for example, ethylene diamine, diethylene triamine, polyethylene polyamines, propylene-1,3-diamine, dipropylene triamine, polypropylene polyamines, tetramethylene-1,4-diamine, pentamethylene-1,5-diamine, hexamethylene-1,6-diamine, dodecamethylene-1,12-diamine and homologous compounds, N-monoalkylated and N,N'-dialkylated diamines such as N-methyl-1,3 - diaminopropane, N,N' - dimethylethylene diamine, cycloaliphatic diamines such as 1,3- and 1,4-hexahydrophenylene diamine, tetrahydronaphthylene diamines, 4,4'-diaminodicyclohexylmethane, perhydrobenzidine, 1,5-diamino Decalin, heterocyclic diamines such as piperazine, 2,5-dimethylpiperazine, imidazolidine, aromatic diamines such as 1,3- and 1,4-phenylene diamine, 1,3-, 1,4- and 1,5-naphthylene diamine, benzidine, 4,4'-diamino-diphenylmethane, 4,4',4''-triamino-triphenylmethane, tolylene diamines such as 2,4- and 2,6-tolylene diamine as well as isomeric mixtures thereof, perhydrogenated 2,4- and 2,6-tolylene diamine and isomeric mixtures thereof, derivatives of these compounds which are alkylated on the nucleus or monoalkylated on the nitrogen atom, araliphatic diamines such as 4-aminobenzylamine, aminophenyl ethylamines, N-methyl-p-aminobenzylamine and its homologues, 1,4-xylylene diamine, hydrazine, hydrazines which are monoalkylated on one or both N-atoms, dicarboxylic acid dihydrazides such as carbodihydrazide, adipic acid dihydrazide, amino carboxylic acid hydrazides such as aminoacetic acid hydrazide, ε-aminocaproic acid hydrazide, aminobenzoic acid hydrazide, aminosulphohydrazides such as aminobenzylsulphohydrazide and bis-semicarbazides; bishydrazide compounds of the formula

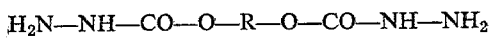

in which R represents an alkylene radical having 2 to 12 carbon atoms, e.g.

may also be used. The bishydrazide compounds may be prepared, for example, as described in Canadian patent specification No. 805,703. Diamines or bishydrazide compounds are preferably used in the process according to the invention.

When carrying out the reaction, the NCO groups and NH groups respectively OH groups (from water) are preferably employed in at least equivalent quantities. If the amounts are substantially below equivalent or stoichiometric quantities, products of inferior quality are obtained.

METHOD II

The amino prepolymers referred to as B prepolymers in the examples can be prepared by numerous methods which are well known. Such substances are easily obtained by the addition of an excess of a low molecular weight polyamine or hydrazine to a compound containing NCO groups. For example, an NCO prepolymer or a low molecular weight monomeric polyisocyanate, preferably in solution, is run with vigorous stirring into a solution of one of the low molecular weight polyamines enumerated hereinbefore in a reaction vessel which may be cooled. The NCO prepolymer is prepared as described in the preparation of the A prepolymers and the same polyisocyanates and active hydrogen containing compounds may be employed. The NH/NCO ratio should be greater than 1 and preferably between about 1.5 and about 5. If very reactive polyamines are used, the NH/NCO ratio is advantageously greater than 5 an any excess unreacted polyamine can be distilled off after the reaction is completed. In order to reduce the amount of excess polyamine which may be present, it may be converted, for example, into its carbonate or carbamic acid derivatives.

Some other compounds which may be used as B type prepolymers in the instant process include the reaction products of an A prepolymer with a sulphamic acid as described in Deutsche Auslegeschrift No. 1,555,907. Another possible method which may be used for synthesizing B type prepolymers is given in French Pat. No. 1,415,-317 which describes the conversion of A type prepolymers into N-formyl derivatives with formic acid followed by partial saponification to yield the amino derivative which is a B type prepolymer. Such prepolymers can also be obtained as described in Belgian Pat. No. 675,425 by adding secondary or tertiary carbinols to A type prepolymers and decomposing the resulting carbamic acid ester into the corresponding amine via an acid catalyzed reaction.

Very highly reactive molecular weight B type prepolymers can be prepared as described, for example in Deutsche Auslegeschrift No. 1,215,373, by reacting higher molecular weight hydroxyl compounds with ammonia or amines under pressure in the presence of a catalyst and at a suitable temperature. Higher molecular weight hydroxyl components may also be reacted with acrylonitrile and then hydrogenated catalytically as described in U.S. Pat. No. 3,044,989. Acid catalyzed reaction products of aminoethyl - 5,6 - dihydro-(4H) pyran derivatives and higher molecular weight hydroxyl components as described in Dutch Auslegeschrift No. 6,601,435 may also be used. Lastly, B type prepolymers which have a satisfactory reactivity and a good solubility in organic solvents can be prepared according to the process outlined in U.S. Pat. No. 2,888,439 by the addition of nitroaryl isocyanates or, according to French Pat. No. 1,474,551, by the addition of isocyanatoazobenzene derivatives to higher molecular weight hydroxyl components followed by reduction. According to the process described in Canadian patent specification 805,703 higher molecular weight compounds which contain terminal OH groups can be made to undergo an ester interchange reaction with diphenylcarbonate accompanied by the evolution of phenol; carboxylic acid phenol esters react with hydrazine to form hydrazodicarbonic acid esters, phenol again being split off. These compounds are also suitable for use in this invention because they contain reactive terminal $NH_2$ groups. All the B type prepolymers prepared in this manner are suitable for use in the practice of this invention and they can be reacted with the usual di- or polyisocyanates.

Some suitable organic polyisocyanates which may be used in the practice of this invention include 1,4-tetramethylene- and 1,6 - hexamethylenediisocyanates, 1,4-cyclohexanediisocyanate, m- and p-phenylenediisocyanates, 2,4- and 2,6-tolylene diisocyanates and isomeric mixtures thereof as well as the corresponding hydrogenation products, p-xylene diisocyanate, 4,4'-diphenylether diisocyanate, 4,4' - diphenylsulphone-diisocyanate, 4,4'-diphenylmethane diisocyanate, 2,2 - di(p - isocyanatophenyl)-propane, 3,3' - dimethyldiphenylmethane-4,4'-diisocyanate, 3,3' - dichlorodiphenylmethane-4,4'-diisocyanate, 1,5 - naphthylene diisocyanate, 4,4',4" - triphenyl methane - triisocyanate, tri-p-isocyanato-phenyl-thiophosphate, the material produced by the reaction of 1 mol of trimethylol propane with 3 mols of tolylene-2,4-diisocyanate, the reaction product derived from 3 mols of 1,6-hexamethylene diisocyanate and 1 mol of water, which reaction product has the formula

and any of those suggested elsewhere herein. The use of diisocyanates is preferred. In this reaction also the NCO and NH groups respectively OH groups should be used in at least equivalent amounts.

METHOD III

The starting materials for this reaction have already been set forth in the discussion given with respect to Methods I and II. All of the prepolymers and low molecular weight compounds mentioned herein may be used either alone or in solution in a suitable solvent. Again, the NCO and HN groups respectively OH groups should be used in at least equivalent amounts.

PRODUCTION OF THE MOLDED PRODUCT

The process is usually carried out by emulsifying the polymer latex described hereinbefore with one of the starting components for the formation of the polyurethane polyurea, and then emulsifying the second component which is mixed therewith and immediately shaping the resulting mixture. If water is used as a cross-linking agent, it may be necessary to add a cross-linking catalyst. Other liquids which are nonsolvents for the polymers, such as petroleum hydrocarbons, alcohol or ether may also be added to the emulsion and sometimes it is advisable to add more water to the dispersion. After the shaping and solidification of the polymer mixture, the excess solvent, nonsolvent and/or water are evaporated off in the usual manner.

The proportion of polyurethane polyurea to polymer in the aqueous polymer dispersion may lie between about 2% and about 98% of polyurethane polyurea based on the total solids present. The total solids present preferably consist of from about 10% to about 80% of polyurethane polyurea and in one embodiment, from about 30% to about 60%. Coagulation of the polymer latex can be carried out at temperatures of between about 0° and about 98° C., preferably between 25° and 60° C.

Emulsifiers, fillers, vulcanization or cross-linking agents, stabilizers, dyes, pigments and higher molecular weight siloxanes which improve the hydrophobic character of the products as well as silicone compounds may be included in the dispersions. It is also possible to produce porous foils by adding compounds which are nonsolvents both for the polymer of the olefinically unsaturated compounds and for the polyurethane elastomer to be produced. In such cases the breadth of variation of the starting components with respect to the microporosity of the product is not as great.

To produce microporous elastic foils, the molded product must have Shore A values of more than about 40 and preferably more than about 65, tensile strengths of more than about 70 kg. wt./cm.² and softening points above about 100° C. If the Shore A hardness is too low, the polymer tends to lose its microporosity when subjected to pressure. The determination of suitable starting components can easily be made by preparing a sample of the final product in non-microporous form from said starting materials and determining the tensile strength, Shore A hardness and softening point of this sample. They have to meet the above requirements.

The microporosity of the product is produced by the nonsolvent used so that it is necessary to use more than 15% and preferably more than about 40% by weight of nonsolvent based on the sum of the weights of the olefin polymer, starting components for the polyurethane elastomer and solvent.

The final properties of the molded product depend on the properties of the olefin polymer and the polyurethane polyurea elastomer used. Thus, for example, soft elastic foils can be produced from an olefin polymer dispersion which would otherwise yield hard, nonelastic foils by incorporating a polyurethane having suitable properties therein. If the polymer by itself yields only sticky soft molded products, an elastic molded product can still be produced by incorporating a hard polyurethane.

A particularly preferred embodiment comprises plasticizing dispersions of hard olefin polymers which have little tendency to form films with polyurethanes in accordance with this invention.

A commercial polyvinyl chloride dispersion, for example, does not yield a film on drying but only loosely coherent polymer particles. If polyaddition is carried out according to the process of this invention; that is, the polyaddition of a prepolymer which contains $NH_2$ groups and an NCO prepolymer in the polyvinyl chloride dispersion, highly elastic products are obtained after evaporation of the water and solvent which contains a polyurea acting as a nonvolatile plasticizer which is resistant to migration The products of this invention are particularly useful for lining vessels, as packaging foils, for coating or covering metals, woven fabrics, non-wovens, leather and wood and so on.

The invention is further illustrated but is not intended to be limited by the following examples in which all parts and percentages are by weight unless otherwise specified.

PREPARATION OF PREPOLYMERS CONTAINING ISOCYANATE GROUPS.—A TYPE PREPOLYMERS

A1

About 2,000 parts of a linear polypropylene glycol ether having a molecular weight of about 2,000 are mixed with about 336 parts of 1,6-hexamethylene diisocyanate and heated to about 110° C until the free isocyanate group content drops to about 3.5%, which requires about 8 to 9 hours A slightly yellowish oil having a viscosity of about 2125 cp./25° C. is obtained.

A2

About 250 parts of 4,4'-diphenylmethane diisocyanate are added to about 1,000 parts of a linear polypropylene glycol ether having a molecular weight of about 2,000 and heated to about 80° C. for about 6 hours. A viscous yellow oil which contains about 3.3% of free isocyanate groups is obtained.

A3

About 1,700 parts of a polyester prepared from adipic acid and a mixture of hexane-1,6-diol and 2,2-dimethylpropane-1,3-diol in the ratio of 65:35 and having a molecular weight of about 1,700 and OH number of 66 are heated to about 80° C. and about 348 parts of tolylene-2,4-diisocyanate are added. After about 90 minutes at about 80° C., the NCO content drops to about 4.1%. A pale yellow product which has the consistency of an ointment is obtained.

A4

About 500 parts of a polyester prepared from phthalic acid, adipic acid and ethylene glycol and having an average molecular weight of about 1,666 (OH number 67.4) are dehydrated at about 130° C./12 mm. Hg and about 113 parts of 4,4'-diphenylmethane diisocyanate are added. After about 15 minutes at about 130° C. the NCO content of the yellow resin is about 1.8%.

A5

About 990 parts of a copolyether prepared by the alternate polymerization of ethylene oxide and propylene oxide in a ratio of 1:1 using butane-1,4-diol as starter (OH number 56.5) are heated with about 168 parts of hexamethylene-1,6-diisocyanate (1 mol) at about 100° C. for about 5 hours after having been dehydrated at about 130° C./13 mm. Hg. The NCO content of the pale yellow oil is about 3.54% (calculated 3.63%).

NCO-CONTAINING PREPOLYMERS A8 TO A22 ARE PREPARED AS DESCRIBED IN A1 TO A3 USING THE COMPONENTS AS INDICATED IN THE FOLLOWING TABLE

| No. | Higher molecular weight compound containing at least two active hydrogen atoms | Polyisocyanate | Molar ratio | Free NCO group content (percent) | Consistency or viscosity |
|---|---|---|---|---|---|
| A8 | Linear polypropylene glycol ether (molecular weight 12,000, OH number 56). | 4,4'-diphenylmethane diisocyanate | 1:1.5 | 1.64 | Yellow resin. |
| A9 | do | do | 1:3 | 6.2 | Do. |
| A11 | Mixture of a polysiloxane having the formula HO-CH$_2$-(Si(CH$_3$)$_2$-O)$_{12}$-Si(CH$_3$)$_2$-CH$_2$-OH and a linear polypropylene glycol ether (molecular weight 2000, OH number 56), in a molar ratio of 1:3. | do | 1:2 | 3.68 | Do. |
| A14 | Copolyether of 80% propylene oxide and 20% ethylene oxide (molecular weight 4150, OH number 27). | 1,6-hexamethylene diisocyanate | 1:2 | 2.5 | 1,875 cp./25° C. |
| A19 | Polyester of adipic acid and a mixture of 65 parts of hexane-1,6-diol and 35 parts of 2,2'-dimethylpropane-1,3-diol (molecular weight 1,700, OH number 66). | do | 1:2 | 4.1 | Consistency of ointment. |
| A20 | Polyester of adipic acid and a mixture of hexane-1,6-diol and 2,2'-dimethyl-propane-1,3-diol in a molar ratio of 11:6 (molecular weight 1,870, OH number 62). | 4,4'-diphenylmethane diisocyanate | 1:1.5 | 1.8 | Do. |
| A22 | Polyester of adipic acid and diethylene glycol (molecular weight 600, OH number 187). | Isomeric mixture of 2,4- and 2,6-tolylene diisocyanate (80:20). | 1:2 | 10.6 | Highly viscous. |

PREPARATION OF PREPOLYMERS WHICH CONTAIN AMINO END GROUPS.—B TYPE PREPOLYMERS

B1

About 7 parts (0.1285 mol) of hydrazine hydrate and about 315 parts of tetrahydrofuran are introduced into a 3 liter glass beaker and a solution of about 300 parts of the NCO-prepolymer A4 (0.1285 mol NCO) in about 450 parts of toluene and about 150 parts of tetrahydrofuran are run into this mixture with vigorous stirring and cooling with ice in the course of about 15 minutes. A thick liquid 25% solution of a prepolymer containing semicarbazide end groups is obtained.

B2

A solution of about 457 parts (0.385 mol NCO) of prepolymer A5 in about 300 parts of water are added in the course of about 10 minutes to a solution of about 20 parts of hydrazine hydrate (0.385 mol) in about 165 parts of water and contained in a 3 liter glass beaker, with vigorous stirring and cooling with ice. A viscous 50% aqueous solution of a prepolymer containing semicarbazide end groups is obtained.

B3

About 5 parts (0.103 mol) of hydrazine hydrate are dissolved in about 100 parts of water in a 2 liter glass beaker and about 40 parts of prepolymer B2 are added.

In a second glass beaker, about 100 parts (0.0856 mol NCO) of prepolymer A1 and about 20 parts (0.0174 mol NCO) of prepolymer A5 are emulsified with vigorous stirring in about 167 parts of water in a second glass beaker, and the emulsion is poured into a solution prepared as described above in the course of about 5 minutes with vigorous stirring. An about 33.3% aqueous emulsion of a prepolymer containing semicarbazide end groups is obtained.

PREPOLYMERS B4 TO B22 WHICH CONTAIN AMINO GROUPS ARE PREPARED AS DESCRIBED IN B1 TO B3 USING THE COMPONENTS AS INDICATED IN THE FOLLOWING TABLE

| Number | Prepolymer A number | Diamine | NCO:NH ratio | Solvent | Solution concentration (percent) | Active NH (mmol/g.) |
|---|---|---|---|---|---|---|
| B4 | A10 | Hydrazine | 1:2 | Benzene | 50 | 0.687 |
| B13 | A20 | do | 1:2 | Toluene | 33.3 | 0.141 |
| B17 | A9 | 4-aminophenylethylamine | 1:2 | Tetrahydrofuran | 30 | 0.363 |
| B18 | A8 | do | 1:2 | Benzene | 40 | 0.155 |
| B19 | A8 | do | 1:2 | Tetrahydrofuran | 40 | 0.155 |
| B20 | A15 | do | 1:2 | Diisopropyl ether | 33.3 | 0.195 |
| B21 | A16 | do | 1:2 | Ethyl acetate | 33.3 | 0.163 |
| B22 | A18 | do | 1:2 | Toluene | 33.3 | 0.267 |

B32

About 1950 parts (1.0 mol) of polypropylene glycol-(1,2)-ether are added to about 329 parts (2 mol) of distilled p-nitrophenylisocyanate in about 1.5 liters of tetrahydrofuran and the solution stirred for about 2 hours at reflux temperature. After the addition of Raney nickel the product is hydrogenated at about 100° C. using about 50 excess atmospheres of hydrogen, filtered and the solvent is evaporated under reduced pressure. The diamine yield is greater than 99% of the theoretical; NH number 50.5.

EXAMPLE 1

About 10 parts of a 60% dispersion of an emulsion of polyvinyl chloride (K value 70) and about 180 ml. of water are dispersed in a mixture of about 50 ml. of a 0.2 molar solution in benzene of NCO prepolymer A14 (10 mmol NCO) and 25 ml. of prepolymer A19 ( 5 mmol NCO) using high speed stirrer operating at about 4000 to about 6000 revs./min. About 7.5 ml. of a 1 molar aqueous solution of hexamethylene diammonium carbonate (15 mmol $NH_2$) are then added and the reaction mixture is stirred for about 10 seconds before being poured onto a glass plate having an area of about 100 cm.$^2$ and heated at about 80° C. to complete the polyaddition. A microporous film having the following properties is obtained:

Permeability to water vapor: (IUP 15; published e.g. in "Das Leder" 1961, 86–88): 1.5 mg./h. cm.$^2$
Flexometer: >200,000 bends (IUP 20; published e.g. in "Das Leder" 1964, 87–88)
Tensile strength: 26.7 kg. wt./cm.$^2$ (IUP 6; published e.g. in Das Leder" 1959, 14–18)
Elongation at break: 130% (IUP 6)
Tear propagation resistance: 14 kg. wt./cm. (IUP 8; published in "Des Leder" 1961, 39–40)
IUP: International Union for Physical Testing

EXAMPLE 2

About 40 parts of a 50% emulsion of a copolymer of acrylonitrile and butadiene are dispersed with about 4% of methacrylic acid and about 250 ml. of water in about 64 parts (10 mmol $NH_2$) of $NH_2$ prepolymer B18 and 100 parts of ethyl acetate. After the addition of about 5 ml. (10 mmol NCO) of a 2 N solution in benzene of 4,4'-diphenylmethane diisocyanate, the reaction mixture is stirred for about 10 seconds and then poured onto a steel support and dried at about 75° C. A microporous film having the following properties is obtained:

Permeability of water vapor—1.6 mg./h. cm.$^2$
Flexometer—>200,000 bends
Tensile strength—19 kg. wt./cm.$^2$
Elongation at break—580%
Tear propagation resistance—9 kg. wt./cm.

Part of the above dispersion is poured onto a silicone-backed paper from which it is then removed and dried at about 100° C./100 mm. Hg. A microporous film is obtained which has properties similar to those listed above.

TABLE I.—THE FOLLOWING TESTS ARE CARRIED OUT AS DESCRIBED IN EXAMPLE 1

| NCO prepolymer | Or (ml.) 0.2 molar solution (based on NCO) (g.) | Solvent | Mmol NCO | Polymer dispersion, Table C | Quantity (g.) | Water (ml.) | Polyamine | Or (ml.) 1 molar aqueous solution= mmol $NH_2$ (g.) | Solvent | Stirring time (sec.) | Drying temperature (°C.) | Flexometer (bends) | Tensile strength (kg. wt./cm.$^2$) | Elongation at break, percent | Tear propagation resistance (kg. wt./cm.) | Permeability to water vapor (mg./hcm.$^2$) | Shore hardness A | Remarks |
|---|---|---|---|---|---|---|---|---|---|---|---|---|---|---|---|---|---|---|
| A3 | 50 | Benzene | 10 | C8 | 10 | 110 | p-Aminophenyl ethylamine | 10 | | 10 | 75 | | | | | 2.9 | | (a) |
| A3 | 75 | ...do... | 15 | C8 | 10 | | ...do... | 15 | Benzene | 8 | 75 | 200,000 | 25.5 | 570 | 2.3 | 1.5 | | |
| A2 | 60 | | 40 | C8 | 30 | 70 | Catalyst: N-methyl-N'-(N-dimethyl-aminoethyl) piperazine; (cross-linking with water) | 0.5 | | 40 | 75 | | | | | 0.7 | | |
| A1 | 24 | | 20 | C1 | 20 | | Tetramethylene diamine | 1.25 | | 10 | 80 | | | | | 1.8 | | (b) |
| A2 | 23.5 | | 10 | C3 | 30 | | Hydrazine hydrate (90% in water) | | | | | | | | | | | |
| DPMDI* | 12.5 | | 100 | C1 | 70 | | | | Ethyl acetate | 10 | 75 | | 10 | 200 | 3 | 1.0 | | |
| A19 | 50 | Benzene | 10 | C2 | 10 | 50 | 4,4'-dihydra-zino-stilbene disulphonic acid-2,2' | 2 | | 10 | 75 | 200,000 | 22 | 620 | 7 | 1.0 | | (c) |

See footnote at end of table.

TABLE I—Continued

| NCO prepolymer | (g.) | Solvent | Or (ml.) 0.2 molar solution (based on NCO) | Mmol NCO | Polymer dispersion, Table C | Quantity (g.) | Water (ml.) | Polyamine | (g.) | Or (ml.) 1 molar aqueous solution = mmol NH₂ | Solvent | (g.) | Stirring time (sec.) | Drying temperature (° C.) | Flexometer (bends) | Tensile strength (kg. wt./cm.²) | Elongation at break, percent | Tear propagation resistance (kg. wt./cm.) | Permeability to water vapor (mg./hcm.²) | Shore hardness A | Remarks |
|---|---|---|---|---|---|---|---|---|---|---|---|---|---|---|---|---|---|---|---|---|---|
| A2 | 69.5 | | | 50 | C8 | 6 | 40 | Tetrahydronaphthylene diamine-1,5. | 3.4 | (⁴) | Benzene | 100 | 10 | 75 | 200,000 | 17 | 125 | 13.1 | 0.8 | | (ᵈ) |
| A22 | | Ethyl acetate. | 50 | ¹50 | C6 | 50 | | p-Aminophenyl ethylamine. | | 50 | | | 8 | 75 | | | | | 3.7 | | (ᵉ) |
| HMDI | | Benzene. | 50 | (¹)50 | C6 | 50 | 50 | Hydrazine hydrate (90% in water). | 1.1 | | | | 30 | 75 | | | | | 1.6 | | (ᶠ) |
| DPMDI** | | do | 50 | ²200 | C6 | 50 | 50 | 4,4'-dihydrazinostilbene disulphonic acid-2,2'. | 10 | | | | 15 | 60 | | | | | 1.0 | | (ᶠ) |
| HMDI | | do | 50 | ¹50 | C5 | 20 | 20 | Hydrazine hydrate (90% in water). | 1.4 | | Tetrahydrofuran. | 5 | 10 | 75 | | | | | 0.9 | | |
| DPMDI** | | do | 50 | ²200 | C6 | 50 | 50 | 4,4'-dihydrazinostilbene disulphonic acid-2,2'. | 10 | | Benzene | 30 | 12 | 60 | | | | | 1.6 | | (ᶠ) |
| A14 HMDI | 17 8.4 | | | 10 }C7 100 | | 13 | 60 | Hydrazine hydrate (90% in water). | 2.5 | | | | 30 | 75 | | | | | 1.0 | | |
| A22 TDI | 4.5 | }do | 50 | ³100 C7 | | 15 | 50 | Triethylamine as catalyst (cross-linking with water). | 5 | | | | 10 | 20 | | | | | 1.1 | | |
| A1 | 25 | | | | C2 | 50 | 18 | Diethylene triamine. | 2 | | Benzene | 25 | 5 | 20 | | | | | 1.8 | | |
| A2 DPMDI* | 60 12.5 | | | 25 }C11 100 | | 100 | 100 | Triethylamine (cross-linking with water). | 4 | | do | 100 | 100 | 20 | | | | | | 50-2 | Non-porous film. |
| A2 | 47 | | | 20 | C10 | 50 | 50 | Naphthylene-1,5-diamine. | 1.5 | | Tetrahydrofuran and ethyl acetate. | 20 100 | 20 | 75 | | | | | | 72-5 | Do. |
| A2 | 47 | | | 20 | C1 | 50 | 70 | Adipic acid dihydrazide. | | 20 | Ethyl acetate. | 100 | 20 | 75 | | 45 | 1,200 | 10 | | 52-4 | Do. |
| A22 | | Ethyl acetate. | 20 | ¹20 | C4 | 50 | 30 | 4,4'-diaminodiphenylmethane. | | 20 | do | 60 | 20 | 75 | | 20 | 210 | 10 | | 70 | Do. |
| A22 | | Benzene | 50 | ¹50 | C1 | 30 | 80 | Adipic acid dihydrazide. | | 25 | Benzene | 50 | 30 | 20 | | 75 | 430 | 24 | | 52 | Do. |
| A1 | | do | 50 | 10 | C7 | 30 | 100 | Hexamethylene diammonium carbonate. | | 10 | do | 25 | 10 | 20 | | 26 | 275 | 5.6 | | 48-50 | Do. |

¹ 1 molar (based on NCO) solution.
² 4 molar (based on NCO) solution.
³ 2 molar (based on NCO) solution.
⁴ dissolved in 20 g. of water.

ᵃ Plus 10 g. 3% aqueous polyvinyl alcohol solution as thickening agent.
ᵇ Plus 10 g. 33% zinc oxide dispersion.
ᶜ Plus 0.5 g. zinc oxide.
ᵈ Plus 0.4 g. lead chromate, plus 0.7 g. red iron oxide, plus 1 g. colloidal silicic acid.
ᵉ Plus 0.4 g. sulphur, 0.6 g. zinc oxide, 0.2 g. double salt, plus 1 g. ethyl phenyldithiocarbamate and cyclohexylethylamine.
ᶠ Plus 0.4 g. sulphur, 0.6 g. zinc oxide, plus 0.2 g. double salt from zinc ethylphenyldithiocarbamate and cyclohexylamine.

Abbreviations.—DPMDI*=4,4'-diphenylmethane diisocyanate; DPMDI**=partly carbodiimidized 4,4'-diphenylmethane diisocyanate; HMDI=hexamethylene 1,6-diisocyanate; TDI=tolylene diisocyanate isomeric mixture.

TABLE II.—THE FOLLOWING TESTS ARE CARRIED OUT AS DESCRIBED IN EXAMPLE 2

| NH₂ prepolymer | Or (ml.) 0.2 molar solution (of NCO) (G.) | Solvent | Mmol NH₂ | Polymer dispersion Table C | Quantity (g.) | Water (ml.) | Polyisocyanate or NCO prepolymer | Molar | Solvent | Quantity (ml.) or (g.) | Mmol NCO | Stirring time (sec.) | Drying temperature (°C.) | Shore hardness A | Flexometer (bends) | Tensile strength (kg. wt./cm.²) | Elongation at break (percent) | Tear propagation resistance (kg. wt./cm.) | Permeability to water vapor (mg./hcm.²) | Remarks |
|---|---|---|---|---|---|---|---|---|---|---|---|---|---|---|---|---|---|---|---|---|
| B19 | 51.7 | | 10 | C1 | 20 | 100 | 4,4-DPMDI | 2 | Ethyl acetate | 5 | 10 | 8 | 75 | 58-60 | >200,000 | 21 | 800 | 6.5 | 0.5 | Plus 40 g. ethyl acetate. |
| B19 | 51.7 | | 10 | C9 | 25 | 110 | 4,4-DPMDI | 2 | do | 5 7 | 10 | 10 | 110 | | >200,000 | 16 | 210 | 2.7 | 0.8 | Do. |
| B19 | 51.7 | | 10 | C1 | 40 | 250 | 4,4-DPMDI | 2 | do | 5 | 10 | 8 | 75 | | | 25 | 600 | 4.4 | 16.8 | Plus 100 g. ethyl acetate. |
| B18 | 64 | | 10 | C1 | 40 | 250 | 4,4-DPMDI | 2 | do | 5 | 10 | 10 | 75 | | >200,000 | 19 | 575 | 8.9 | 1.6 | Do. |
| B18 | 16 | | 2.5 | C8 | 10 | 100 | 4,4-DPMDI | 2 | do | 1.25 | 2.5 | 10 | 75 | | | 9.8 | 350 | 8.3 | 7.3 | Plus 30 g. ethyl acetate. |
| B13 | 71 | | 10 | C8 | 20 | 120 | TDI | 2 | do | 5 | 10 | 8 | 110 | | | 28 | 325 | 6 | 4.4 | Plus 110 g. benzene. |
| B17 | 82 | | 29.8 | C2 | 20 | 260 | 4,4-DPMDI | 1 | Benzene | 20 | 20 | 6 | 75 | | | | | | 2.9 | |
| B24 | 25.6 | | 10 | C8 | 20 | 250 | A19 | 0.2 | do | 50 | 10 | 20 | 80 | | | | | 6 | 4.2 | Plus 20 g. benzene. |
| B18 | 64 | | 10 | C7 | 10 | 250 | A3 | 0.2 | Ethyl acetate | 25 (10 g.) | 10 | 8 | 70 | | 100,000 | 16 | 560 | 11 | 0.7 | (¹). |
| B32 | 30 | | 10 | C1 | 30 | | Partly carbodiimized 4,4-DPMDI | | | 5.6 | | 10 | 60 | | >200,000 | 33 | 410 | 7.3 | 1.6 | Plus 100 g. ethyl acetate. |
| B32 | | *50 Ethyl acetate | 50 | C1 | 20 | 100 | Methylene chloride | 1 | | 50 | 50 | 10 | 60 | | >200,000 | 36 | 760 | 8.3 | 1.0 | (²). |
| B32 | | **50 Benzene | 25 | C4 | 7.2 | 150 | TDI | 2 | Benzene | 13 | 26 | 15 | 75 | | 100,000 | 12 | 655 | 6 | 1.2 | (³). |
| B32 | | **50 do | 25 | C4 | 14.4 | 150 | TDI | 2 | do | 13 | 26 | 15 | 75 | | 100,000 | 10 | 430 | 6 | 1.1 | (⁴). |
| 117/2a | 95 | | 10 | C1 | 50 | 100 | HMDI | 1 | do | 10 | 10 | 10 | 80 | | | | | | 3.9 | |
|  | | | | C8 | 20 | | | | | | | 5 | | | | | | | | |
| 166/2 | 48 | | 20 | C5 | 50 | 200 | HMDI A19 | 0.1 | do | 10 50 | 10 20 | 5 | 60 70 | | | | | 6.4 | | (⁵). |
| 170/2a | 72.4 | | 20 | C5 | 50 | 50 | HMDI | 0.1 | do | 20 | 20 | 5 | 80 | | | | 250 | 1.3 | | (⁶). |
| 160/2 | 48 | | 20 | C5 | 50 | 80 | A19 | 0.2 | Di-n-propyl ether | 100 | 20 | 5 | 75 | 45 | 100,000 | 17 | 980 | 1.1 | | (⁶). |
| B23 | 50 | | 10 | C11 | 50 | 80 | A22 | | | 10 | 10 | 10 | | | >200,000 | 45 | | 5 | | (⁷). |
| B13 | 71 | | 10 | C8 | 20 | 250 | TDI | 2 | Chloroform | 5 | 10 | 10 | 110 | 55-60 | >200,000 | 40 | 640 | 6 | | |
| 160/2 | 48 | | 20 | C3 | 10 | 120 | A19 | 0.2 | Benzene | 100 | 20 | 5 | 75 | | | 39 | 520 | | | Plus 6 g. zinc oxide. |

¹ Plus 0.3 g. Basic Brown 1; C.I. 21000.
² Plus 80 g. benzene, plus 0.5 g. Acid Orange 10 color Index 16230.
³ Plus 1.4 g. zinc oxide, plus 20 g. ethyl acetate.
⁴ Plus 2.8 g. zinc oxide, plus 20 g. ethyl acetate, plus 3.6 g. polysiloxane emulsion.
⁵ Plus 30 g. of a zinc oxide sludge (30% in water).
⁶ Plus 30 g. of a 30% aqueous zinc oxide sludge.
⁷ Plus 0.4 g. sulphur, 0.6 g. zinc oxide, 0.2 g. double salt of zinc ethyl phenyl dithiocarbamate and cyclohexylamine.
*1 normal solution based on NH₂.
**0.5 normal solution based on NH₂.
Abbreviations.—4,4-DPMDI=4,4'-diphenylmethane diisocyanate; TDI=Isomeric mixture of 65% 2,4- and 35% 2,6-tolylene diisocyanate; HMDI=hexamethylene-1,6-diisocyanate.

What is claimed is:

1. A process for preparing sheet structures which comprises emulsifying an aqueous emulsion of a thermoplastic or elastomeric polymer of an unsaturated monomer which emulsion has a solids content of 5 to 70 percent by weight into a reaction product of (a) a compound containing at least two hydrogen atoms reactive with NCO groups and having a molecular weight of between 500 and 10,000 and a molar excess of a polyisocyanate or (b) a molar excess of an organic polyamine with (a); adding a crosslinking agent for (a) or (b) to the resulting dispersion in the presence of a nonsolvent for the polymer from (a) and (b) which crosslinking agent is a polyamine in case (a) and an organic polyisocyanate in case (b); immediately shaping the dispersion to form a sheet structure and evaporating volatile liquid constituents from the sheet with the proviso that more than 15% by weight of non-solvent based on the sum of the weights of the polymer of the unsaturated monomer, (a), (b) and the other liquid constituents is present.

2. The process of claim 1 wherein the thermoplastic or elastomeric polymer is natural rubber, polybutadiene, polyisoprene, polychloroprene, styrene butadiene copolymer, butadiene acrylonitrile copolymer, polyvinyl chloride, polyvinylidene chloride, polystyrene, ethylene vinyl acetate copolymer, polyacrylonitrile, styrene acrylonitrile copolymer, butadiene acrylonitrile methacrylic acid copolymer or butadiene styrene acrylonitrile and methacrylic acid copolymer.

3. The process of claim 1 wherein the thermoplastic polymer is polyvinyl chloride.

4. The process of claim 1 wherein the solids content is from 30% to 60%.

References Cited

UNITED STATES PATENTS

| | | | |
|---|---|---|---|
| 3,326,848 | 6/1967 | Clemens et al. | 260—29.2 TN |
| 3,438,940 | 4/1969 | Keberle et al. | 260—29.6 NR |
| 3,472,807 | 10/1969 | Isaacs | 260—29.6 NR |
| 3,491,050 | 1/1970 | Keberle et al. | 260—29.6 NR |
| 3,536,638 | 10/1970 | Dosmann | 260—2.5 AY |
| 3,100,721 | 8/1963 | Holden | 264—41 UX |
| 3,190,765 | 6/1965 | Yuan | 264—41 UX |
| 3,238,055 | 3/1966 | Brightwell | 264—41 UX |
| 3,296,016 | 1/1967 | Murphy | 264—41 UX |
| 3,348,963 | 10/1967 | Fukushima et al. | 264—41 UX |
| 3,369,925 | 2/1968 | Matsushita et al. | 264—41 UX |
| 3,388,100 | 6/1968 | Thoma et al. | 264—41 UX |
| 3,403,046 | 9/1968 | Schwacke et al. | 264—41 UX |

FOREIGN PATENTS

| | | | |
|---|---|---|---|
| 639,553 | 4/1962 | Canada | 264—41 |

PHILIP E. ANDERSON, Primary Examiner

U.S. Cl. X.R.

117—161 KP; 260—2.5 AY, 29.2 TN, 29.6 NR, 77.5 AX, 77.5 CH, 859; 264—53, 331, Dig. 62, Dig. 77